(12) United States Patent
Bouat

(10) Patent No.: US 7,936,738 B2
(45) Date of Patent: May 3, 2011

(54) FAULT TOLERANT SYSTEMS

(75) Inventor: Sebastien Bouat, St Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1381 days.

(21) Appl. No.: 10/536,625

(22) PCT Filed: Jul. 6, 2004

(86) PCT No.: PCT/EP2004/051371
§ 371 (c)(1),
(2), (4) Date: Mar. 2, 2006

(87) PCT Pub. No.: WO2005/015883
PCT Pub. Date: Feb. 17, 2005

(65) Prior Publication Data
US 2006/0143494 A1    Jun. 29, 2006

(30) Foreign Application Priority Data
Jul. 25, 2003   (EP) ..................................... 03291852

(51) Int. Cl.
*H04B 7/216*   (2006.01)
(52) U.S. Cl. .................. 370/342; 714/2; 714/3; 714/10; 714/11
(58) Field of Classification Search .................. 370/342; 714/2, 3, 10, 11
See application file for complete search history.

(56) References Cited

U.S. PATENT DOCUMENTS

| | | | |
|---|---|---|---|
| 6,320,949 B1 * | 11/2001 | Kim | 379/201.01 |
| 7,155,632 B2 * | 12/2006 | Vasavada | 714/4 |
| 2003/0005356 A1 * | 1/2003 | Franckowiak et al. | 714/11 |
| 2003/0046604 A1 * | 3/2003 | Lau et al. | 714/11 |
| 2004/0088418 A1 * | 5/2004 | Iyer et al. | 709/227 |
| 2005/0265346 A1 * | 12/2005 | Ho et al. | 370/392 |

FOREIGN PATENT DOCUMENTS

| | | |
|---|---|---|
| EP | 1 309 142 A | 5/2003 |
| WO | 02/093863 A | 11/2002 |

OTHER PUBLICATIONS

Chandranmenon, G.P., et al., "Trading Packet Headers fir Packet Processing", IEEE/Acm Transactions on Networking, vol. 4, No. 2, pp. 141-152 (Apr. 1996).

Singh, H., "Distributed Fault-Tolerant/High-Availability Systems" Online Article, Dec. 12, 2001. Retrieved from the internet URL:http://web.archive.org/web/20011210243 54/http://www.trillium.com/news-events/white-papers/index.html> (Jan. 7, 2004).

* cited by examiner

*Primary Examiner* — Ricky Ngo
*Assistant Examiner* — Luat Phung

(57) ABSTRACT

According to one embodiment of the present invention, there is provided a method of storing context information in an outgoing message sent from a node using a protocol stack having at least one layer, comprising: selectively indicating to a layer of the protocol stack that context information should be obtained for that layer; obtaining context information in accordance with the indication; and adding the obtained context information to the outgoing message such that a response to the message contains the context information.

34 Claims, 4 Drawing Sheets

Shown as co located but in reality likely to be distributed over many machines/servers and locations

PRIOR ART

FAULT TOLERANT SYSTEMS

The present invention relates to the field of fault tolerant systems and relates to a method and system for providing fault tolerance in, for example, message-based communication systems.

Many critical systems, such as telecommunications networks, have essential elements which are required to function twenty-four hours a day, three hundred and sixty five days a year. For many such systems the amount of acceptable downtime is in the order of no more than a few minutes per year. To achieve this, critical systems are often designed to be fault tolerant, such that a fault or failure of a system or component of a system does not cause significant disruption to the services provided thereby. Such systems are often also referred to as high-availability (HA) systems.

A system may be arranged to be high-availability in a number of different ways, for example, through use of an active and standby system, or using a cluster of servers, as is well known in the art. With an active/standby system, in the event of a fault being detected in the active system, a switchover of the active and standby systems occurs such that the standby system becomes the active system, and vice versa. In this way, services which were available before the fault was detected should still be available, albeit, potentially, after a short delay, once the switchover has occurred.

Different levels of high-availability exist which may be split into two broad categories, referred to herein as 'service continuity' and 'task preservation'. Service continuity refers to the ability to continue to use the services provided by a system after a fault or switchover of a high-availability system, whereas task preservation, a higher level of high-availability, refers to the ability for tasks being processed when a fault or switchover occurs to be largely unaffected by the switchover.

For example, in a telephone network, a service may be the ability to establish calls between parties, and a task may be a call currently in progress. In this context, service continuity generally means that any calls in progress when a fault occurs will typically be dropped, whereas calls placed after the fault has occurred will be established in the normal manner—in other words, the provision of the service is preserved, albeit after a short delay. In a task preservation system active calls will be maintained even during a switchover of an active/standby system.

In order to provide task preservation a common storage element is often provided in addition to a high-availability configuration. Context data relating to each task is stored in the common storage area, and may be used in the event of a switchover for reinitializing the new active system with the context of any tasks which were in progress when the switchover occurred.

In a telephony network, this context information may relate to the state of different protocol layers of a protocol stack as well as any application specific data related to individual calls. Upon a switchover to a standby system, the newly activated system can recover the stored context data from the common storage element and rebuild the protocol stack and application context for calls open at the time of the switchover. In this way, processing of calls open at the time of a switchover may continue on the new active system without significant interruption.

However, the requirement for a common storage area for storing context data adds to the complexity and cost of such systems.

Accordingly, one aim of the present invention is to overcome at least some of the above-mentioned problems.

According to a first aspect of the present invention, there is provided a method of storing context information in an outgoing message sent from a node using a protocol stack having at least one layer. The method comprises: selectively indicating to a layer of the protocol stack that context information should be obtained for that layer, obtaining context information in accordance with the indication, and adding the obtained context information to the outgoing message such that a response to the message contains the context information.

Suitably the node is arranged in a high-availability configuration.

Suitably the outgoing message is sent from the node to a remote node across a network, for example using a message-based communications system.

Preferably the step of obtaining context information is adapted for obtaining context information related to the outgoing message.

Preferably the obtained context information is appended to a separate field of the message.

The method may be used with a session initiation protocol (SIP) network, in which case the obtained context information may be appended to a SIP TAG field, or to a SIP extension header.

An indication associated with the obtained context data may be added where it is determined that the context data may be inaccurate or incomplete.

According to a second aspect of the present invention, there is provided a method of restoring the context information of a layer of a protocol stack of a node. The method comprises receiving a message, determining whether the context information of the layer should be restored, and, where it is so determined, determining the presence of context information relevant to the layer within the message, and restoring the context of the layer using context information from the message.

Preferably the step of determining is adapted for determining whether the context information of the layer should be restored based in part on the context information of the layer and in part on the received message.

The step of determining further comprises checking the existence at the layer of context information associated with the received message.

The step of determining further comprises checking whether the received message is an initial message.

The method may be adapted for use with a session initiation protocol (SIP), in which case the step of restoring the context of the layer is adapted for restoring the context using context information stored either in a SIP TAG or in a SIP extension header.

According to a third aspect of the present invention, there is provided a system for storing context information in an outgoing message sent from a node using a protocol stack having at least one layer. The system comprises means for indicating to a layer of the protocol stack that context information should be obtained for that layer, a module for obtaining context information in accordance with the indication, and a circuit for adding the obtained context information to the outgoing message such that a response to the message contains the context information.

Suitably the node is arranged in a high-availability configuration.

Suitably the outgoing message is sent from the node to a remote node across a network, for example, using with a message-based communications system.

Preferably the context information obtained is related to the outgoing message.

Preferably the obtained context information is appended to a separate field of the message.

Suitably the obtained context information is appended to a SIP TAG field or to a SIP extension header.

An indication associated with the obtained context data may be added where it is determined that the context data may be inaccurate or incomplete.

According to a fourth aspect of the present invention, there is provided a system of restoring the context information of a layer of a protocol stack of a node which comprises: receiving means for receiving a message, logic for determining whether the context information of the layer should be restored, a circuit for determining the presence of context information relevant to the layer within the message, and restoration means for restoring the context of the layer using context information from the message.

Preferably the logic for determining is adapted for determining based in part on the context information of the layer and in part on the received message.

Preferably the logic for determining is adapted for checking the existence at the layer of context information associated with the received message.

Suitably the logic for determining is adapted for checking whether the received message is an initial message.

The system may be used, for example, with the session initiation protocol (SIP), in which case the restoration means is adapted for restoring the context using context information stored in a SIP TAG or a SIP extension header.

According to a fifth aspect of the present invention, there is provide a method of sending a message from a node through a hierarchical structure of one or more discreet layers comprising: indicating to a layer that context information should be obtained for that layer, obtaining context information in accordance with the indication, and adding the obtained context information to the message, such that a response to the message contains the context information.

According to a sixth aspect of the present invention, there is provided a method of restoring the context information of a layer of a hierarchical structure of discreet layers comprising: receiving a message, determining whether the context information of the layer should be restored, and, where it is so determined, determining the presence of context information relevant to the layer within the message, and restoring the context of the layer using context information from the message.

The invention will now be described, by way of example only, with reference to the accompanying drawings, in which.

Figure 1:
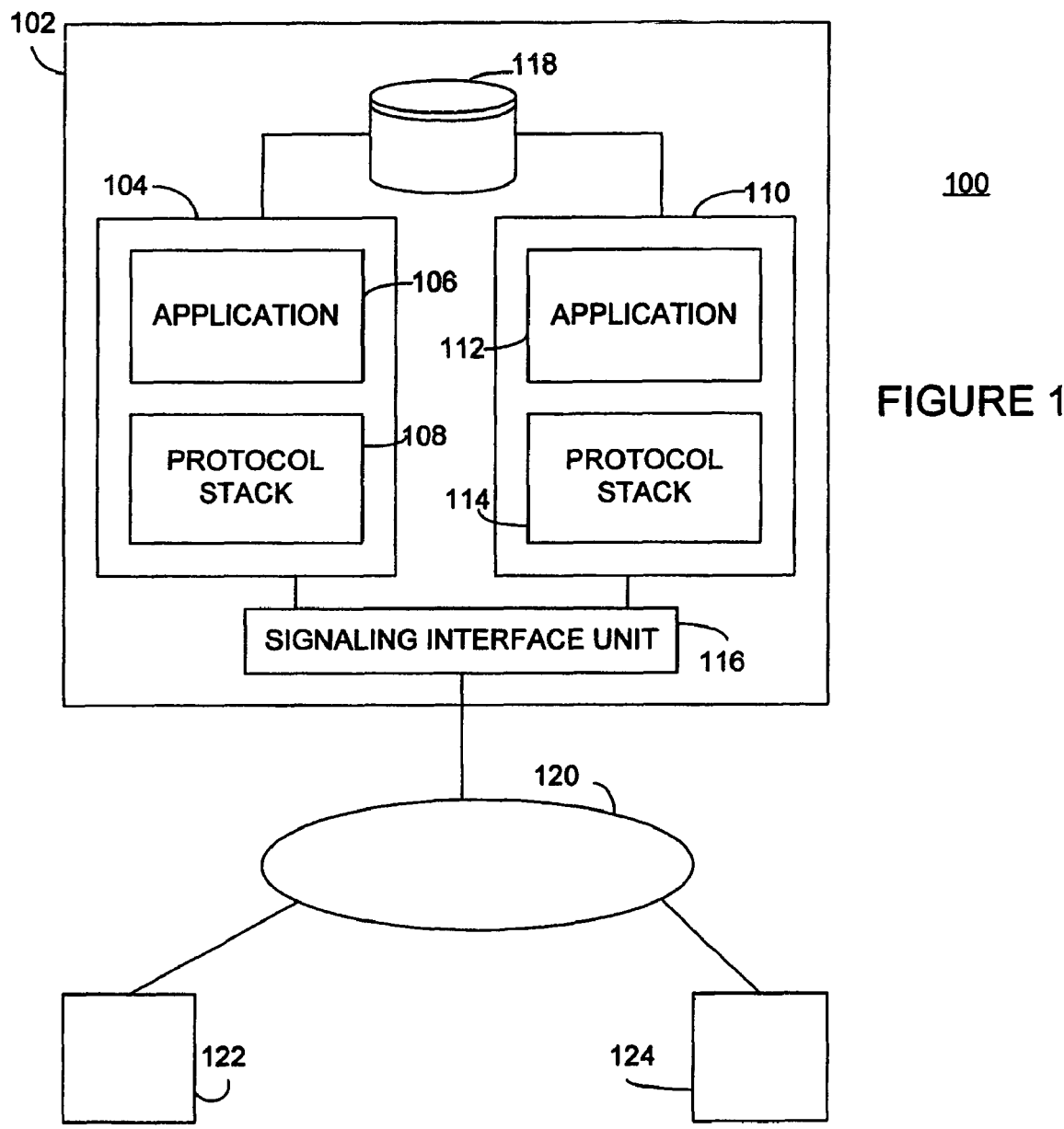
FIG. 1 is a block diagram of a high-availability system according to the prior art.

FIG. 1 is a block diagram of a fault tolerant or high-availability system 100 according to the prior art. A telephone switch 122 communicates with a high-availability network element 102 over a network 120 to provide value added services or to control access to a network resource. The network 120 may, for example, be an SS7 network, in which case the network element 102 may, for example, be a service control point (SCP).

The network element 102 comprises two similar peer systems 104 and 110 which are arranged in a known fault tolerant, or high-availability, configuration, in which one of the systems is arranged in an 'active' mode, whilst the other system is arranged in a 'standby' mode. In the event of a fault being detected in the current active system, a switchover will occur such that the current active system becomes the standby system, and vice-versa. Call processing may thus continue on the new active server. Switchover may also be initiated manually, for example to enable maintenance to be carried out on an active server.

Each of the peer systems 104 and 110 comprise numerous elements, such as an application (106 and 112 respectively) and a protocol stack (108 and 114 respectively). The systems 104 and 110 also have access to a common storage element, such as a database 118. As calls are processed on the active server the application 106 may decide to store context data in the storage element 118. The context data may relate, for each call, to both application context data and context data relating to one or more layers of the protocol stack 108. In the event of a switchover from the active server to the standby server, the stored context data may be retrieved by the application on the new active server, and be used to rebuild, for each call, the context of the application 112 and the protocol stack 114. This helps ensure that processing of calls open at the time of the fault is continued once the new active server has been initialized.

One of the problems of this kind of arrangement is the need to maintain a shared or common storage element, which adds additional complexity, and hence cost, to such a system.

Figure 2:
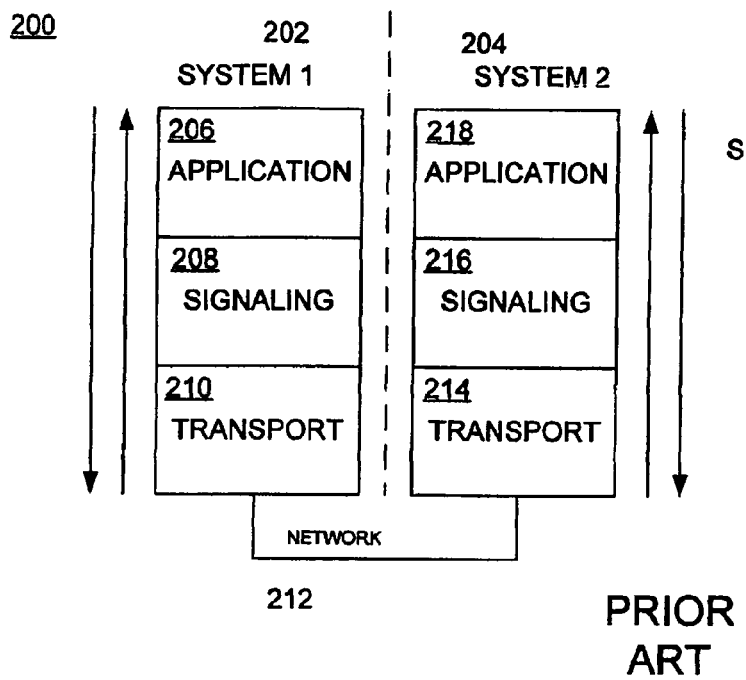
FIG. 2 is a diagram of a pair of remote systems connected via a network according to the prior art.

FIG. 2 shows a view of a pair of remote systems 202 and 204 connected via a network 212 in accordance with the prior art. Each system has a protocol stack comprising an application layer (206 and 218 respectively), a signaling layer (208 and 216 respectively), and a transport layer (210 and 214 respectively). Those skilled in the art will appreciate that a greater or lesser number of protocol layers may be used depending on particular requirements. According to normal convention, each layer of the protocol stack may communicate with the layer directly above and below the layer, where applicable.

For example, if an application (not shown) at application layer 206 needs to send a message across a network to an application at the application layer 218 of system 204, the message is passed to the signaling layer 208 where compliance with the signaling protocol is ensured. The signaling layer 208 passes the message to the transport layer 210 which ensures that the message is ready to be sent across the network 212. The transport layer 214, at the destination, receives the message, and passes the message to the signaling layer 210 which processes the message and finally passes the message to an application in the application layer 212. As will be appreciated by those skilled in the art, each layer of the protocol stack may process the message, add/remove additional headers and encapsulation etc. in dependence on the particular communications protocols used.

Figure 3:
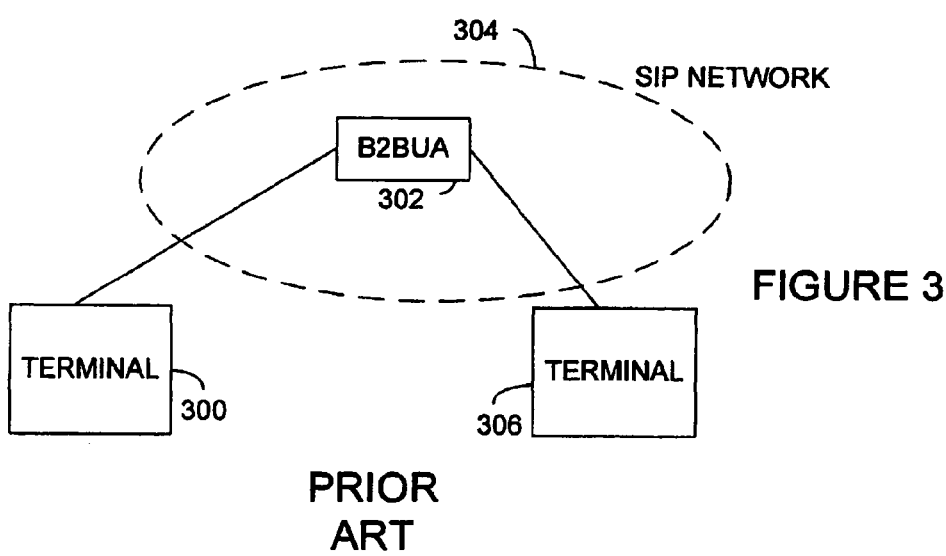
FIG. 3 is a block diagram of a basic SIP network according to the prior art.

The systems 202 and 204 may be any kind of system or network nodes which communicate with one another using messages, across a network, using one or more layers of a protocol stack. For example, as shown in FIG. 3, systems 202 and 204 may represent, respectively, a SIP user agent 300 and a SIP back-to-back user agent (B2BUA) 302 of a session initiation protocol (SIP) network According to an embodiment of the present invention, the need for a high-availability system to store context data in a central data store is removed by appending context data to a message sent from a HA system, such that a message sent in response thereto contains the context data. In the event of a switchover, the context data received in a response message may be used to restore the context data of one or more layers of the protocol stack of the HA system, as will be described in greater detail below.

Figure 4:
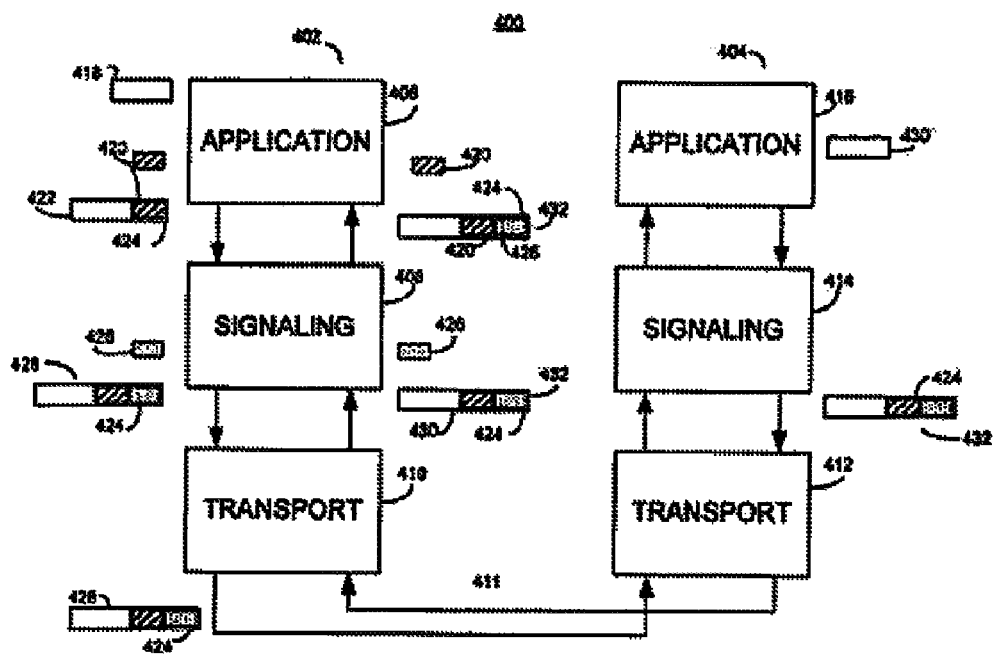
FIG. 4 is a block diagram of a system according to an embodiment of the present invention.
Figure 5:
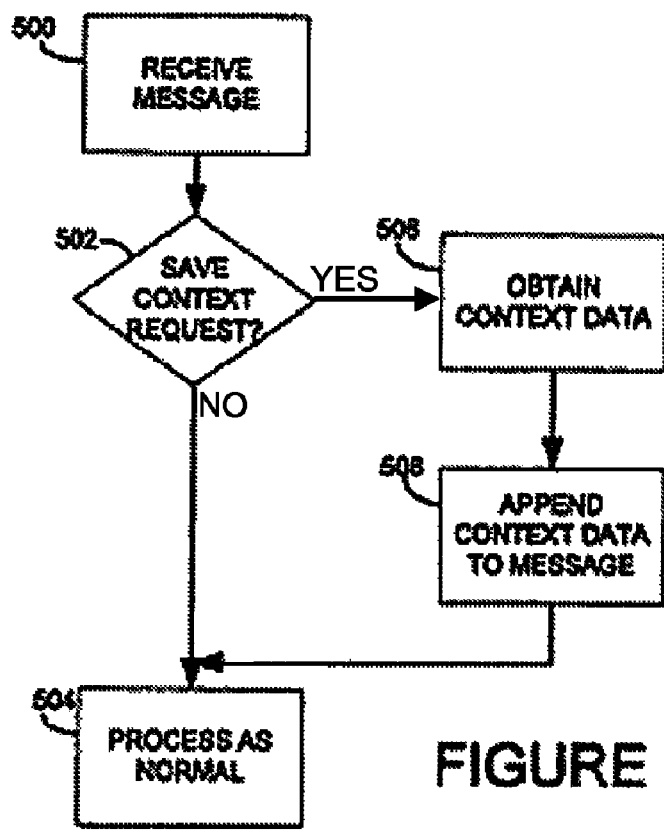
FIG. 5 is a flow diagram outlining example processing steps taken when sending a message, according to an embodiment of the present invention.

Referring now to FIG. 4, there is shown a block diagram of an exemplary system 400 according to an embodiment of the present invention, in which a HA node 402 communicates with a network node 404 across a network 411. Each of the nodes 402 and 404 comprise a protocol stack each having an application layer (406 and 416 respectively), a signaling layer (408 and 414 respectively) and a transport layer (410 and 412 respectively). The operation of the system 400 will be described with additional reference to the flow diagrams of FIGS. 5 and 6 which outline example processing steps which may be taken by each layer of the protocol stack of the system 402.

An application (not shown) at the application layer 406 of HA node 402 sends an outgoing message 418 to an application at application layer 416 across the network 411. Additionally, the application indicates that context data should be stored to enable the context of one of more layers of the protocol stack of system 402 to be rebuilt in case of switchover the high-availability node 402. An application may indicate that it requests context data of the protocol stack to be stored in a number of different ways. For example, the application may add an additional field or flag when sending the message 418 via an API or function call used for sending messages. Alternatively, a flag may be set in the message sent from the application which indicates to each layer whether context data should be stored. It may also be desirable to automatically store context data for the protocol stack in every message sent from a HA node. In this case, it may not be required for the application to request that the context data should be stored, since this may be configured to occur automatically.

The amount of context data stored may differ depending on particular circumstances. For example, in a telecommunication system messages may be sent from a HA node to another node, with each message relating to a particular call. In this case, it may be desirable to only store context information relating to that call with the outgoing message. From a HA node point of view, a call may be viewed as comprising two call legs—one between the calling party and the HA node, the other between the HA node and the called party. In this case, the context data may include context data of both legs. Those skilled in the art, however, will appreciate that this is only one example of the type and amount of context data that may be stored. In a further embodiment, only a subset of the available context data is stored for each layer. Preferably the subset of context data stored is sufficient to enable processing of any open tasks to continue, albeit in a degraded manner.

The application layer 406 receives the message from the application (step 500) and, in response to the indication to store context data (step 502), obtains context data 420 (step 506) for the application layer 406. The application layer appends the context data 420 to the message 418 (step 508), forming a message 422 comprising the original message 418 and the context data 420. Preferably, a separate field 424 is used to store the context data 420. The message 422 is then passed to the underlying signaling layer 408.

The message 422, comprising the message 418 and the application layer context data 420 in the context field 424 is received by the signaling layer 408 (step 500) which, in response to the indication to store context data (step 502), obtains the relative context data 426 (step 506) from the signaling layer, and adds it to the context field 424 of the message (step 508), forming a message 428. The message 428 is then processed as normal, and is passed through the transport layer 410 to the transport layer 412 across the network 411, where the message passes up through the protocol stack of the system 404 in the normal manner.

When the application at the application layer 416 sends a message in response to the received message, the signaling layer 414 appends the previously received context field 424 to the message, forming message 432. It should be noted that in a SIP implementation, the transport layer of the protocol stack is not required to store context data since the transport layer is 'connectionless' from the SIP point of view. Thus in SIP, only the application and signaling layers are required to store context data.

Figure 6:
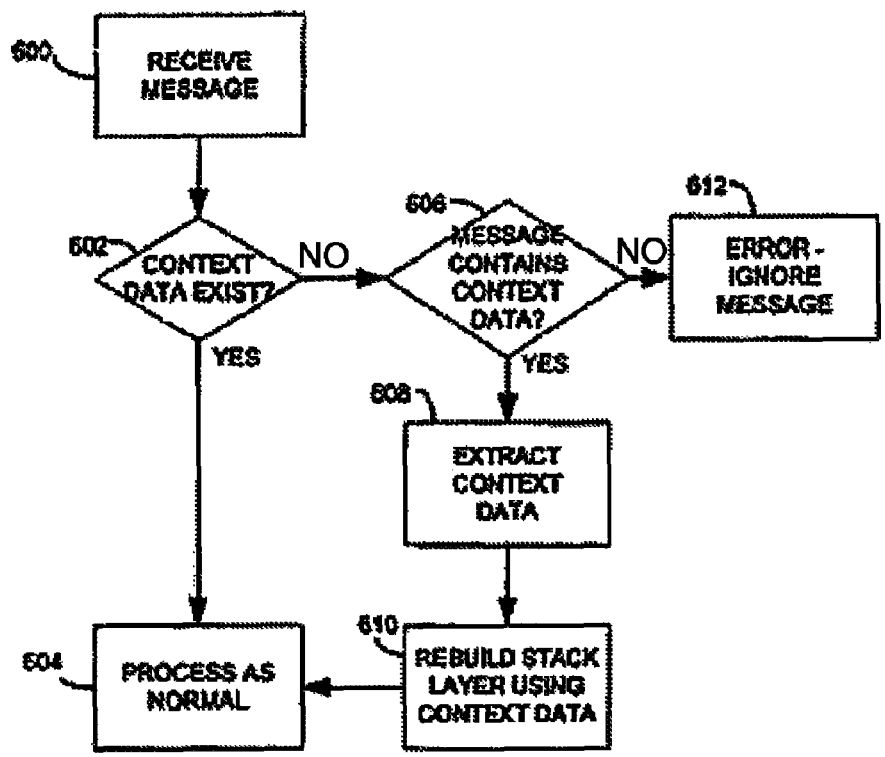
FIG. 6 is a flow diagram outlining example processing steps taken when receiving a message, according to an embodiment of the present invention.

The way in which messages received by the HA node 402 are processed at each layer of the protocol stack is shown in FIG. 6. When the response message 432 is received at the transport layer 410, the message is processed in the normal manner and is passed to the signaling layer 408.

If no switchover of the HA node 402 has occurred, the HA node 402 will already have context information, such as the call identification, relating to the message received from the system 404, providing that the message is not an initial message, such as a SIP INVITE message (step 602). In this case, the signaling layer processes the message as normal (step 604), ignoring the context field, and passes the message to the application layer 406.

If, however, a switchover of the HA node 402 has occurred, the HA node 402 will have no context information relating to the received message. This may also occur, however, if the message is an initial message, such as a SIP INVITE message. If it is determined that there is no context information available at the HA node 402 relating to the received message, and that the message is not an initial message, the message is analyzed to determined to whether the message 432 contains a context field 424 (step 606). If no context field 424 exists the received message is presumed to be erroneous and may, depending on requirements, be ignored or trigger an appropriate message transmission or other suitable action (step 612). If the message does contain the context field 424, the context data for the current protocol layer (context data 426) is extracted (step 608) and is used to reinitialize the context for that layer (step 610). The message 432 is then processed as normal (step 610), and the process repeated for the application layer 406. In this way, the response message contains sufficient context data to enable the context at the HA node to be restored, in the event of a failure or switchover.

In a further embodiment, a SIP extension header may be used to store the context field. Preferably the header used is such that once the context field is stored therein, all subsequent response messages include the context field. In this way, the context data does not need to be stored locally at the HA node since response messages will, where context data has previously been stored, include the context field containing context data to enable the protocol stack to be re-initialized in the event of a switchover.

Although the context data received in a response message may be slightly out-of-date or incomplete, there will generally be enough data to enable the protocol stack to be re-initialized after a switchover without the user being aware that a switchover occurred.

For example, the context data may include a destination address of a SIP call, which would enable SIP messages related to that call to be routed to the correct destination.

In a yet further embodiment for use with SIP, use may be made of the TAG feature as defined in the Request for Comments (RFC) 3261. The TAG feature is a field in a SIP message which, if used, must be set in the first outgoing message from a node, and thereafter, the TAG is included in all related messages and response messages. The SIP specifications define that the TAG must not be altered once set.

Figure 7:
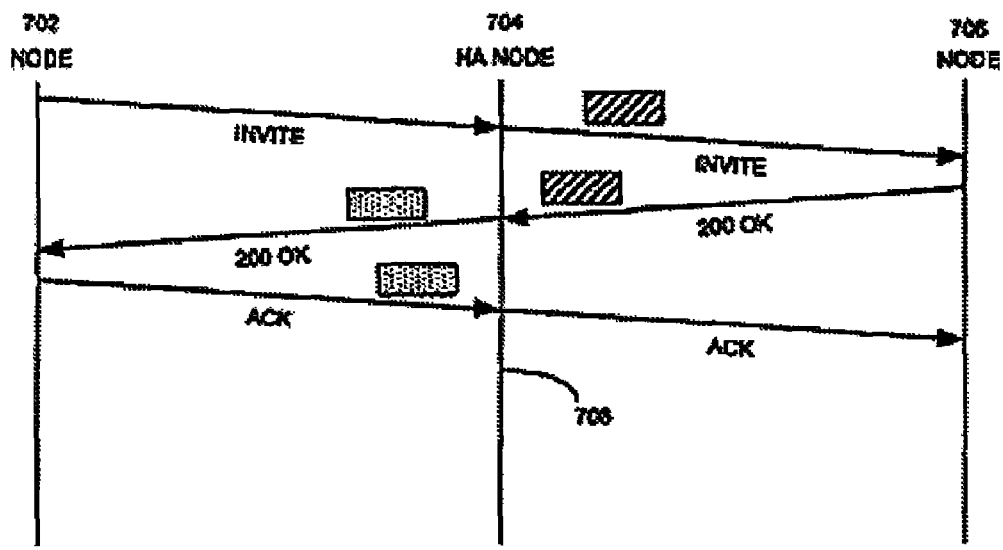
FIG. 7 is a message flow diagram illustrating an example exchange of messages in accordance with an embodiment of the present invention.

However, at the time the first INVITE message is sent, and depending on particular circumstances, the full context data may be unavailable, since the call is only established later in time, at point 708 as shown in FIG. 7.

FIG. 7 is a message flow diagram illustrating an example exchange of SIP messages between a calling party node 702 and a high-availability node 704, and between a called party node 706 and the high-availability node 704. The calling party node 702 sends an INVITE message to the HA node 704 to establish a connection with the called party node 706. The HA node 704 forwards the INVITE message to the called party node 706 but, in order to store the context data representing the state of the protocol stack of the HA node, the HA node is required to include the context data in the TAG field of the INVITE message since this is the first message sent from the HA node 704 to the called party 706.

One problem is that, at this stage, the call has not yet been established. For example, if the application running at the application layer of the HA node 704 is a billing application the context data stored in the TAG message may not accurately represent the actual data related to the call. For example, a billing application will generally be required to know the time a call is established and the time a call ended in order to generate a billing record. However, when the called party receives the INVITE message an indeterminable amount of time may exist between the time the phone starts ringing and the time the call is answered. Hence, by having to store context data relating to the start time of the call before the call is answered may lead to inaccurate context data being stored. In the event of a switchover occurring, and the protocol stack being re-initialized as described above, the restored billing information may be inaccurate, which could result in a user being overcharged.

Hence, preferably any billing record generated as a result of restored context data should be flagged as such, thereby allowing the service provider to either offer the call free of charge, or to reduce the cost of the call in question to take into account that the billing record generated thereby may be inaccurate. Alternatively, it may be preferable to flag the context data as being inaccurate, or at least potentially inaccurate, when adding the context data to the outgoing message.

It will be appreciated by those skilled in the art that the above-described embodiments are not limited for use with any particular protocol stack or HA system, and may be adapted for use with any message based communications or any communication system using a hierarchical structure of one or more discreet layers, where it is desirable to store context or backup data without requiring a central storage means. It will also be appreciated that the above-described functionality may be provided in a number of ways, such as through use a suitably programmed computing device, electronic circuitry or other logic.

Although the above embodiments are described with reference to a switchover of a HA system, it will be appreciated that the inventive concepts presented herein equally apply in other situations where context data is lost or damaged.

The invention claimed is:

1. A method of storing context information in an outgoing message sent from a node including a computing device using a protocol stack having at least one layer, comprising:
   providing, by the computing device, the outgoing message from an application to a layer of the protocol stack, the outgoing message is destined for an application on a destination node;
   selectively indicating to the layer of the protocol stack that context information is to be obtained for that layer;
   obtaining, by the computing device, context information in accordance with the indication; and
   adding, by the computing device, the obtained context information to the outgoing message such that a response, received from the destination node, to the outgoing message contains the obtained context information.

2. The method of claim 1, further comprising adding context information obtained from a different protocol stack layer to the outgoing message.

3. The method of claim 1, wherein the outgoing message is sent from the node is to a remote node across a network.

4. The method of claim 1, used with a message-based communications system.

5. The method of claim 1, wherein the step of obtaining context information obtains context information related to the outgoing message.

6. The method of claim 1, wherein the step of adding the obtained context information appends the obtained context information to a separate field of the message.

7. The method of claim 1, for use with a session initiation protocol (SIP) network.

8. The method of claim 7, wherein the step of adding the obtained context information appends the obtained context information to a SIP TAG field.

9. The method of claim 7, wherein the step of adding the obtained context information appends the obtained context information to a SIP extension header.

10. The method of claim 1, further comprising adding, to the message, an indication associated with the obtained context information where it is determined that the obtained context information is potentially inaccurate or incomplete.

11. A method of restoring context information of a layer of a protocol stack of a node comprising:
   receiving a message by a computing device;
   determining, by the computing device, whether the context information of the layer is to be restored; and,
   where it is so determined,
   determining, by the computing device, the presence, within the message, of context information relevant to the layer; and
   restoring, by the computing device, the context information of the layer using the context information within the message;
   wherein the determining whether the context information of the layer is to be restored further comprises checking whether the received message is an initial message.

12. The method of claim 11, wherein the step of determining determines whether the context information of the layer is to be restored based in part on the context information of the layer and in part on the received message.

13. The method of claim 11, wherein the step of determining further comprises checking the existence at the layer of context information associated with the received message.

14. The method of claim 11, used with the session initiation protocol (SIP).

15. The method of claim 14, wherein the step of restoring the context of the layer restores the context using context information stored in a SIP TAG.

16. The method of claim 14, wherein the step of restoring the context of the layer restores the context using context information stored in a SIP extension header.

17. A system for storing context information in an outgoing message sent from a node using a protocol stack having at least one layer, comprising:
- a circuit for providing the outgoing message from an application to a layer of the protocol stack; the outgoing message is destined for an application on a destination node;
- means for indicating to the layer of the protocol stack that context information is to be obtained for that layer;
- a module for obtaining context information in accordance with the indication;
- a circuit for adding the obtained context information to the outgoing message such that a response, received from the destination node, to the outgoing message contains the obtained context information.

18. A system according to claim 17, wherein the node is configured to add context information obtained from a plurality of protocol stack layers to the outgoing message.

19. A system according to claim 17, wherein the outgoing message is sent from the node to a remote node across a network.

20. A system according to claim 17, for use with a message-based communications system.

21. A system according to claim 17, wherein the context information obtained is related to the outgoing message.

22. A system according to claim 17, wherein the obtained context information is appended to a separate field of the outgoing message.

23. A system according to claim 17, for use with a session initiation protocol (SIP).

24. A system according to claim 23, wherein the obtained context information is appended to a SIP TAG field.

25. A system according to claim 23, wherein the obtained context information is appended to a SIP extension header.

26. A system according to claim 17, wherein an indication associated with the obtained context information is added to the outgoing message where it is determined that the obtained context information is potentially inaccurate or incomplete.

27. A system of restoring context information of a layer of a protocol stack of a node comprising:
- receiving means for receiving a message;
- logic for determining whether the context information of the layer is to be restored;
- a circuit for determining the presence, within the message, of context information relevant to the layer; and
- restoration means for restoring the context information of the layer using the context information within the message;
- wherein the logic for determining is configured for checking whether the received message is an initial message.

28. A system according to claim 27, wherein the logic for determining is configured for determining based in part on the context information of the layer and in part on the received message.

29. A system according to claim 27, wherein the logic for determining is configured for checking the existence at the layer of context information associated with the received message.

30. A system according to claim 27, for use with the session initiation protocol (SIP).

31. A system according to claim 30, wherein the restoration means is configured for restoring the context information of the layer using context information stored in a SIP TAG.

32. A system according to claim 30, wherein the restoration means is configured for restoring the context information of the layer using context information stored in a SIP TAG.

33. A method of sending a message from a node through a hierarchical structure of one or more discreet layers comprising:
- indicating to a layer that context information is to be obtained for that layer;
- obtaining, by a computing device, context information in accordance with the indication; and
- adding, by the computing device, the obtained context information to the message, such that a response to the message contains the obtained context information needed to restore a pre-switchover context of the layer.

34. A method of restoring context information of a layer of a hierarchical structure of discreet layers comprising:
- receiving a message by a computing device;
- determining, by the computing device, whether the context information of the layer is to be restored; and,
- where it is so determined,
- determining, by the computing device, the presence, within the message, of context information relevant to the layer; and
- restoring, by the computing device, the context information of the layer using the context information within the message;
- wherein the determining whether the context information of the layer is to be restored further comprises checking whether the received message is an initial message.

* * * * *